(12) United States Patent
Umeda et al.

(10) Patent No.: US 9,803,766 B2
(45) Date of Patent: Oct. 31, 2017

(54) SNAP-FIT TYPE VALVE

(71) Applicant: SMC CORPORATION, Chiyoda-ku (JP)

(72) Inventors: Kazuhiro Umeda, Noda (JP); Shinichi Yoshimura, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/828,788

(22) Filed: Aug. 18, 2015

(65) Prior Publication Data

US 2016/0076663 A1    Mar. 17, 2016

(30) Foreign Application Priority Data

Sep. 16, 2014  (JP) ................. 2014-187956

(51) Int. Cl.
  *F16K 27/00* (2006.01)
(52) U.S. Cl.
  CPC .................. *F16K 27/003* (2013.01)
(58) Field of Classification Search
  CPC ......... Y10T 137/6011; Y10T 137/7668; Y10T 137/87885; F16K 27/00; F16K 27/003
  USPC .......... 137/315.11, 454.2, 454.4, 454.6, 884; 285/912
  See application file for complete search history.

(56) References Cited

U.S. PATENT DOCUMENTS

| | | | | |
|---|---|---|---|---|
| 3,602,009 A | * | 8/1971 | Powell | F16C 1/08 285/319 |
| 3,686,896 A | * | 8/1972 | Rutter | F16C 1/262 285/319 |
| 4,254,938 A | * | 3/1981 | Inada | F01N 3/00 137/315.04 |
| 4,298,020 A | * | 11/1981 | Inada | G05D 16/0658 137/315.05 |
| 4,921,206 A | * | 5/1990 | Dunstan | F16K 7/06 251/4 |
| 6,189,858 B1 | * | 2/2001 | Miyazoe | F16K 15/185 251/129.06 |

(Continued)

FOREIGN PATENT DOCUMENTS

| | | |
|---|---|---|
| JP | 1479959 | 9/2013 |
| JP | 1479960 | 9/2013 |
| JP | 2014-137118 | 7/2014 |

*Primary Examiner* — Reinaldo Sanchez-Medina
(74) *Attorney, Agent, or Firm* — Oblon, McClelland, Maier & Neustadt, L.L.P.

(57) ABSTRACT

To provide a snap-fit type valve which can be easily attached to and removed from a piping base member. A snap-fit type valve includes a pair of mounting levers on side surfaces of a valve body so as to engage with a base member in a snap-fit manner, wherein the mounting lever includes a shoulder which extends from the valve body, an arm connected to a distal end of the shoulder and an engaging section formed at a distal end of the arm, and is elastically deformable in a direction in which a distance between the engaging sections increases, a first mounting lever which is one of the pair has the shoulder and the arm connected to each other via an arch shaped connecting section and is formed to be elastically deformable at a position of the connecting section, and a second mounting lever which is the other of the pair is formed to be deformable at a position of the shoulder, and has an operation section to elastically deform the shoulder.

9 Claims, 3 Drawing Sheets

(56) References Cited

U.S. PATENT DOCUMENTS

| | | | | |
|---|---|---|---|---|
| 6,497,245 B1* | 12/2002 | Torii | ................ | F02D 9/10 |
| | | | | 123/337 |
| 7,191,795 B2* | 3/2007 | Hettmann | ............... | F16K 24/06 |
| | | | | 137/454.2 |
| 8,066,028 B2* | 11/2011 | Kees | ................... | F15B 13/0814 |
| | | | | 137/315.09 |
| 8,336,852 B1* | 12/2012 | LaHousse | ............. | F16K 27/003 |
| | | | | 251/129.15 |
| 8,413,679 B2* | 4/2013 | Wenske | ............. | F15B 13/0814 |
| | | | | 137/269 |
| D704,303 S | 5/2014 | Yoshimura et al. | | |
| D721,787 S | 1/2015 | Yoshimura et al. | | |
| 2003/0034070 A1* | 2/2003 | Moreno | ................ | F16K 27/003 |
| | | | | 137/454.2 |
| 2005/0253104 A1* | 11/2005 | Sato | ................... | F16K 31/0627 |
| | | | | 251/129.19 |
| 2010/0252760 A1* | 10/2010 | Hettinger | ............. | F16K 27/003 |
| | | | | 251/129.09 |
| 2014/0197341 A1 | 7/2014 | Yoshimura et al. | | |
| 2016/0334028 A1* | 11/2016 | Ito | ........................ | F16K 27/003 |

\* cited by examiner

SNAP-FIT TYPE VALVE

TECHNICAL FIELD

The present invention relates to a valve mounted for use on a piping base member such as a manifold having pipe ports and a sub plate, and more specifically, a snap-fit type valve which can be mounted on the base member in a snap-fit manner by using an elastic force of a pair of mounting levers.

BACKGROUND ART

A valve which is mounted for use on a piping base member by using an elastic force of a mounting lever is known, for example, as disclosed in Patent Literature 1 and Patent Literature 2. The valve includes a pair of mounting levers on opposite side surfaces of a valve body in which a valve mechanism for opening and closing a fluid flow path is housed, so that a first mounting lever which is one of the pair is formed to be elastically deformable and a second mounting lever which is the other of the pair is not elastically deformable.

When the valve is mounted on the base member, an operation section on one end of the second mounting lever is strongly pressed by a finger toward the side surface of the valve body so as to elastically deform the second mounting lever to increase a distance between both mounting levers. Then, an engaging section of a protruding shape on the distal end of the first mounting lever of the opposite side is forced to engage in an engaging groove formed on one side surface of the base member, and then, an engaging section on the distal end of the second mounting lever which is elastically deformed is placed in an engaging groove formed on the other side surface of the base member. Then, elastic deformation of the second mounting lever is released so as to allow the engaging section to be engaged in the engaging groove, thereby allowing the engaging sections of the pair of mounting levers to be engaged in the engaging grooves of the base member.

When the valve is removed from the base member, an operation is performed in the opposite way to that of mounting.

The known valve is advantageous in that it can be mounted on the base member without using a screw. However, since only the second mounting lever which is one of the pair of mounting levers is elastically deformed when the valve is mounted on the base member and removed from the base member, an extent of the elastic deformation needs to be increased. Further, in order to prevent the valve mounted on the base member from being inadvertently removed due to vibration or collision, the mounting lever is formed to have a certain degree of rigidity so as not to be easily elastically deformed. As a result, a significantly large force is required for attaching and removing operation, which causes some difficulties in operationability.

In Patent Literature 3, a valve is disclosed which is configured such that both of a pair of mounting levers are elastically deformable. When the valve is mounted on the base member, a distal end of the pair of mounting levers is placed on the base member from above, and then the valve is straightly downwardly pressed down so that the pair of mounting levers are forced to be apart from each other by the base member. After the engaging sections on the distal ends are elastically fitted and engaged in the engaging grooves on both side surfaces of the base member, the pair of mounting levers recovers so that valve can be mounted on the base member in a snap-fit manner.

However, when the valve is removed from the base member, the operation sections of the pair of mounting levers need to be held by both sides by fingers and deformed in a direction in which they are brought close to each other so that both of the pair of mounting levers are simultaneously elastically deformed to increase a distance between the engaging sections on the distal ends for removing the engaging section from the engaging grooves of the base member. As a result, similar to the valve disclosed in Patent Literature 1 and Patent Literature 2, a significantly large force is required for deformation operation, which causes some difficulties in operationability.

CITATION LIST

Patent Literature

[Patent Literature 1] Japanese Unexamined Patent Application Publication No. 2014-137118
[Patent Literature 2] Design Registration No. 1479960
[Patent Literature 3] Design Registration No. 1479959

SUMMARY OF INVENTION

Technical Problem

A technical object of the present invention is to provide a snap-fit type valve which can perform a mounting operation and a removing operation of the valve on the piping base member compared with conventional valves in a simple manner.

Solution to Problem

In order to solve the above problem, a valve according to the present invention includes a pair of mounting levers that allow a valve body in which a valve mechanism for opening and closing a fluid flow path is housed to be engaged with a piping base member in a snap-fit manner.

The pair of mounting levers include shoulders which extend in opposite directions from a first side surface of the valve body and a second side surface which is opposite to the first side surface, arms which extend in the same direction parallel to each other from a distal end of the shoulders and engaging sections formed on a distal end of the arms so as to engage with the base member, and each of the mounting levers is elastically deformable in a direction in which a distance between the engaging sections increases. A first mounting lever which is one of the pair of mounting levers has the shoulder and the arm connected to each other via an arch shaped connecting section and is formed to be elastically deformable at least at a position of the connecting section, and a second mounting lever which is the other of the pair is formed to be deformable at a position of the shoulder, and has an operation section formed at a proximal end of the arm to protrude in a direction opposite to the arm so as to elastically deform the shoulder.

In the present invention, it is desirable that a thickness of the shoulder of the second mounting lever is smaller than a thickness of the arm and the operation section, and a thickness of the shoulder, the connecting section and the arm of the first mounting lever is smaller than a thickness of the arm and the operation section of the second mounting lever.

Alternatively, it is desirable that, among the shoulder, the arm and the connecting section of the first mounting lever, a thickness of the arm and the connecting section are the same as each other, and a thickness of the shoulder is largest at a proximal end connected to the valve body, gradually decreases toward a distal end connected to the connecting section, and is the same as a thickness of the connecting section at the distal end.

In this case, it is desirable that a thickness of the shoulder of the second mounting lever is the same as a thickness of the arm and the connecting section of the first mounting lever.

In the present invention, it is desirable that a stopper which protrudes toward the valve body is formed at a distal end of the operation section of the second mounting lever, a finger hooking section which protrudes in a direction opposite to the stopper, and a protruding height of the finger hooking section is larger than a protruding height of the stopper.

Further, it is desirable that tubular shaped ports are disposed on a bottom of the valve body so as to extend vertically to the bottom, and a length of the ports which protrudes from the bottom is the same as or larger than a length of the arms of the mounting levers which protrudes from the bottom.

Advantageous Effects of Invention

In the present invention, when the valve is mounted on the base member, lower ends of the arms of the pair of mounting levers are placed on the both side edges on the top of the base member, and then the valve is pressed straightly downward, thereby allowing the valve to be mounted on the base member in a snap-fit manner by elastic deformation of the pair of mounting levers.

Further, when the valve is removed from the base member, the second mounting lever which is one of the pair is elastically deformed and the engaging section of the second mounting lever is removed from the base member, and then, the valve is inclined toward the first mounting lever so that the first mounting lever is elastically deformed and the engaging section is removed from the base member, thereby allowing the valve to be simply removed from the base member.

DESCRIPTION OF EMBODIMENTS

Figure 1:
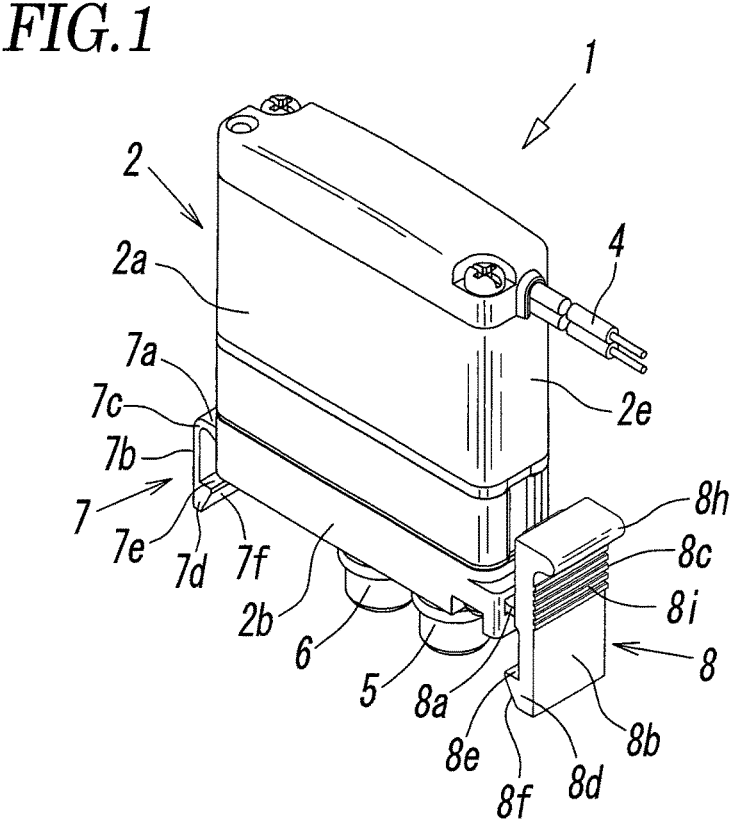
FIG. 1 is a perspective view of a snap-fit type valve according to the present invention as seen obliquely from above.
Figure 2:
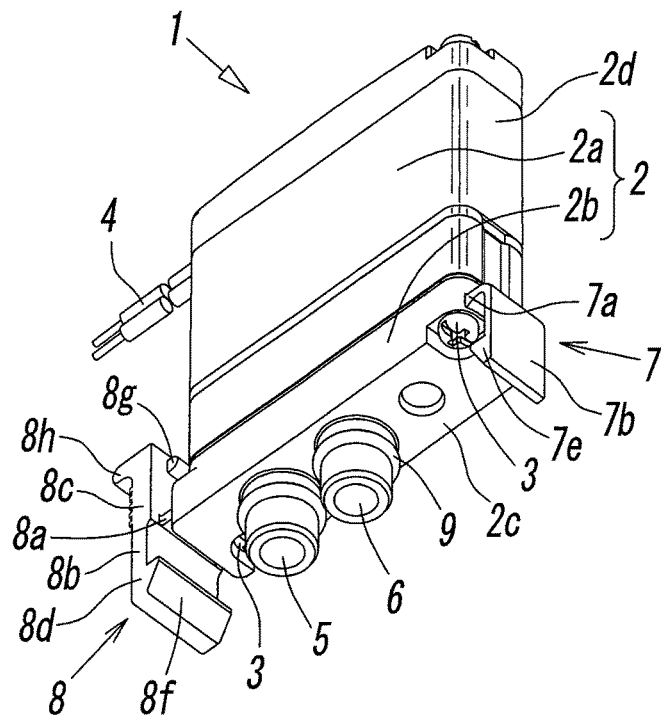
FIG. 2 is a perspective view of the valve of FIG. 1 as seen obliquely from below.
Figure 3:
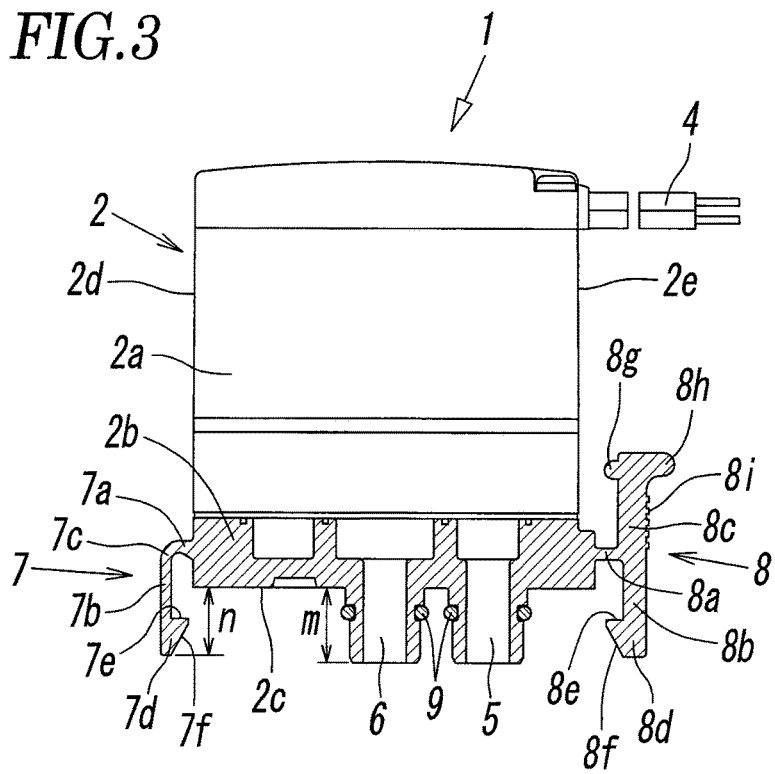
FIG. 3 is a sectional view of an essential part the valve of FIG. 1.

FIG. 1 to FIG. 3 are views which show one embodiment of a snap-fit type valve according to the present invention. A valve 1 has a valve configuration as a poppet type 2 port solenoid valve. The valve 1 includes a valve body 2 formed in a rectangular shape having a longitudinal direction and a short direction in plan view, and a valve mechanism that opens and closes a fluid flow path is housed in the valve body 2. The valve mechanism is substantially the same as that of the valve disclosed in Japanese Unexamined Patent Application Publication No. 2014-137118 which is mentioned above as Patent Literature 1 in the background art and is not directly related to the principle of the present invention. Therefore, the description of the valve mechanism is omitted.

The valve body 2 includes an upper main body 2a in which the valve mechanism is housed and an adaptor 2b which is fixed at the lower end of the main body 2a by screws 3, and a lead wire 4 extends from one side surface in a longitudinal direction on an upper end of the main body 2a so as to be connected to a solenoid of the solenoid valve housed inside.

The adaptor 2b is made of a synthetic resin having elasticity, and an input port 5 and an output port 6 protrude from a bottom 2c of the adaptor 2b at positions slightly close to one end in the longitudinal direction so as to be vertical to the bottom 2c and in parallel to each other. Two ports 5, 6 has the same length m which protrudes from the bottom 2c. Reference number 9 denotes an O-ring mounted on the outer periphery of the port.

Further, two screws 3 are disposed on the bottom 2c of the adaptor 2b at diagonal positions.

In the following description, a left side surface and a right side surface in FIG. 1 to FIG. 3 of both side surfaces in the longitudinal direction of the valve body 2 are referred to as a first side surface 2d and a second side surface 2e, respectively. Accordingly, the lead wire 4 extends from the second side surface 2e and two ports 5, 6 are disposed at positions slightly close to the second side surface 2e.

Figure 4:
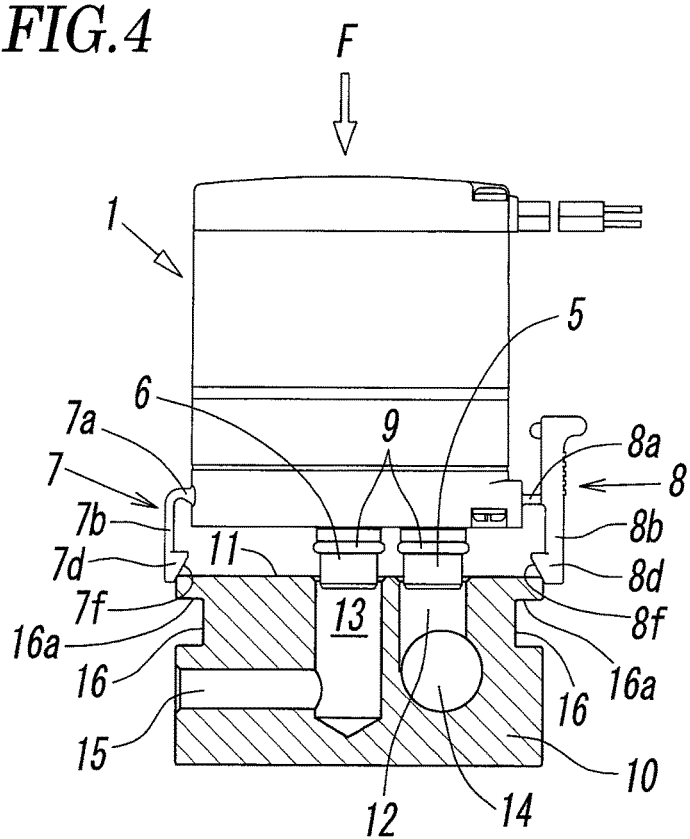
FIG. 4 is an essential sectional view which shows a state immediately before the valve according to the present invention is mounted on a piping base member.

A pair of mounting levers 7, 8 are integrally formed with the adaptor 2b on the both side surfaces in the longitudinal direction of the adaptor 2b, that is, on the first side surface 2d and the second side surface 2e so as to engage in a snap-fit manner with a piping base member 10 (see FIG. 4). The adaptor 2b and the mounting levers 7, 8 are made of the same synthetic resin material and are integrally formed. The lateral width of the mounting levers 7, 8 is substantially the same as the width of the short direction of the adaptor 2b.

The first mounting lever 7 of the pair of mounting levers 7, 8 which is disposed on the first side surface 2d includes a shoulder 7a which extends from the first side surface 2d laterally (horizontally) in the longitudinal direction of the adaptor 2b, an arm 7b which extends from the distal end of the shoulder 7a vertically to the shoulder 7a and in a downward direction, and a connecting section 7c of an arch shape which connects the shoulder 7a and the arm 7b, and is configured to be elastically deformable mainly at the position of the connecting section 7c.

A lower end of the arm 7b extends downward from the bottom 2c of the adaptor 2b, and an engaging section 7d having a protruding shape that protrudes inside, that is, toward the adaptor 2b is formed on the lower end of the arm 7b. An engagement surface 7e which is a horizontal and flat surface is formed on an upper end of the engaging section 7d, and an inclined surface 7f which is inclined in a direction gradually away from the adaptor 2b toward the lower end is formed on an inner surface of the engaging section 7d.

Among the shoulder 7a, the arm 7b, the connecting section 7c, the arm 7b and the connecting section 7c have the same thickness. The shoulder 7a has the thickness which is largest at the proximal end connected to the valve body 2 and gradually decreases toward the distal end connected to the connecting section 7c. The thickness at the distal end is the same as the thickness of the connecting section 7c. Accordingly, the first mounting lever 7 can elastically deform not only at the connecting section 7c, but also at a position close to the distal end of the shoulder 7a and at the arm 7b.

Further, the second mounting lever 8 which is disposed on the second side surface 2e of the adaptor 2b includes a shoulder 8a which extends from the second side surface 2e laterally (horizontally) in the longitudinal direction of the adaptor 2b and opposite to the shoulder 7a of the first mounting lever 7, an arm 8b which extends from the distal end of the shoulder 8a vertically to the shoulder 8a and in a downward direction, and an operation section 8c which extends from the upper end of the arm 8b in a direction opposite to the arm 8b, that is, in an upward direction.

The shoulder 8a has the thickness which is substantially constant across the entire length in the extending direction at a portion which elastically deforms. On the other hand, the arm 8b and the operation section 8c are formed to have the thickness larger than that of the shoulder 8a to prevent from being elastically deformed. The operation section 8c has the thickness larger than that of the arm 8b.

The arm 8b of the second mounting lever 8 extends parallel to the arm 7b of the first mounting lever 7, a lower end of the arm 8b protrudes downward from the bottom 2c of the adaptor 2b, and an engaging section 8d having a protruding shape that protrudes inside, that is, toward the adaptor 2b. An engagement surface 8e which is a horizontal and flat surface is formed on an upper end of the engaging section 8d, and an inclined surface 8f which is inclined in a direction gradually away from the adaptor 2b toward the lower end is formed on an inner surface of the engaging section 8d.

The length of the arm 7b of the first mounting lever 7 which extends from the bottom 2c of the adaptor 2b and the length of the arm 8b of the second mounting lever 8 which extends from the bottom 2c of the adaptor 2b are substantially the same, and accordingly, the engaging section 7d of the first mounting lever 7 and the engaging section 8d of the second mounting lever 8 are disposed at positions which oppose each other.

Further, on the distal end (upper end) of the operation section 8c, a stopper 8g which protrudes toward the second side surface 2e of the valve body 2 and a finger hooking section 8h which protrudes in a direction opposite to the stopper 8g are disposed. The height of the finger hooking section 8h which protrudes from the operation section 8c is larger than the height of the stopper 8g which protrudes from the operation section 8c. A plurality of ribs 8i are arranged parallel in a width direction of the operation section 8c on the outer surface of the operation section 8c for preventing finger slipping so that the second mounting lever 8 can be elastically deformed more simply and reliably by synergic effect of forming the higher finger hooking section 8h and providing the ribs 8i.

The arm 7b and the connecting section 7c of the first mounting lever 7 and the shoulder 8a of the second mounting lever 8 have substantially the same thickness. Accordingly, the arm 7b and the connecting section 7c of the first mounting lever 7 have the thickness smaller than that of the arm 8b and the operating section 8c of the second mounting lever 8.

The length m of two ports 5, 6 formed on the bottom 2c of the adaptor 2b which extends from the bottom 2c is the same or slightly larger than a length n of the arms 7b, 8b of two mounting levers 7, 8 which extends from the bottom 2c.

Figure 5:
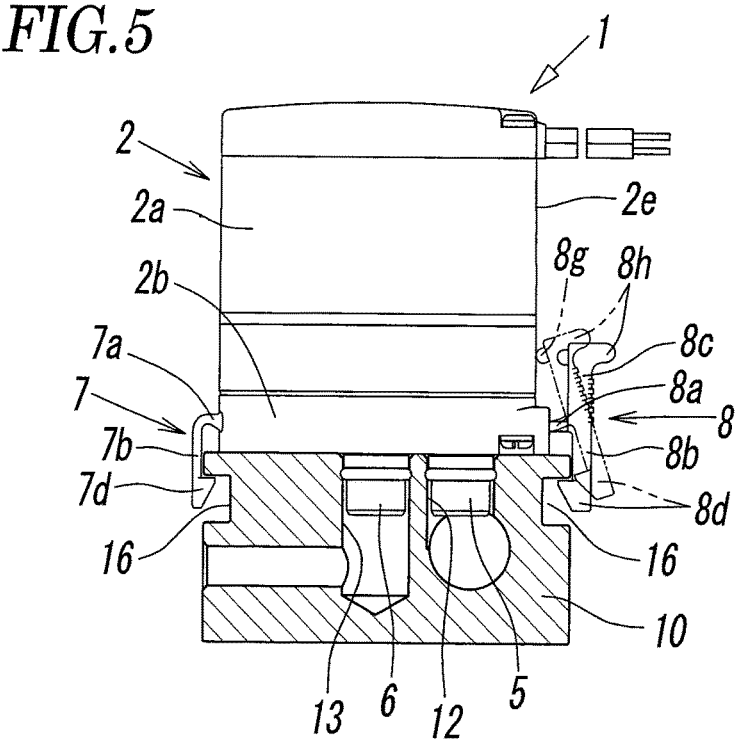
FIG. 5 is an essential sectional view which shows a state that the valve according to the present invention is mounted on the piping base member.
Figure 6:
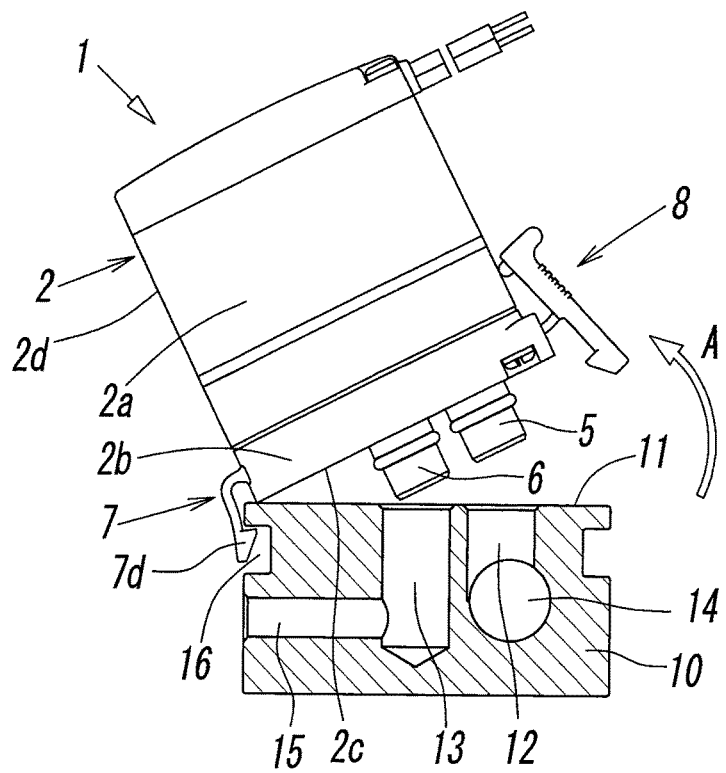
FIG. 6 is an essential sectional view which shows a procedure for removing the valve according to the present invention from the piping base member.

The base member 10 on which the valve 1 is mounted is a block shaped member which is elongated in a vertical direction to the sheet of drawing in FIG. 4 to FIG. 6. A plurality of mounting surfaces 11 for mounting the valve 1 are arranged in the longitudinal direction of the base member 10 on the top of the base member 10. The respective mounting surfaces 11 has a supply hole 12 which fits around the input port 5 of the valve 1 and an output hole 13 which fits around the output port 6. The supply hole 12 communicates with a supply flow path 14 which penetrates through the base member 10, while the output hole 13 communicates with an output port 15 which is open to the side surface of the base member 10 for each of the mounting surfaces 11.

Further, engaging grooves 16 in a recessed shaped are formed at corresponding positions on both side surfaces in the width direction of the base member 10 so as to extend in the longitudinal direction of the base member 10.

When the valve 1 is mounted on the base member 10, as shown in FIG. 4, the inclined surfaces 7f, 8f at the lower ends of the arms 7b, 8b of the pair of mounting levers 7, 8 of the valve 1 are placed on the both side edges on the top of the base member 10, respectively, and then the valve 1 is pressed straightly downward in the arrow F direction. As a result, the pair of mounting levers 7, 8 are expanded by the base member 10, and then the engaging section 7d, 8d elastically recover by fitting in the engaging grooves 16 as shown in FIG. 5. Since the engage surfaces 7e, 8e of the engaging sections 7d, 8d engage with side walls 16a of the engaging grooves 16, the valve 1 is mounted on the base member 10 in a snap-fit manner.

As described above, the length m of two ports 5, 6 which protrudes from the bottom 2c is provided to be the same or slightly longer than the length n of the arms 7b, 8b of two mounting levers 7, 8 which protrudes from the bottom 2c. Accordingly, as shown in FIG. 4, when the inclined surfaces 7f, 8f of two mounting levers 7, 8 are placed on both side edges of the base member 10, the distal ends of the ports 5, 6 slightly fit in the supply hole 12 and output hole 13, respectively, and the valve 1 is placed in position. Then, the valve 1 can be straightly pressed down by pressing down the valve 1 while being guided by the ports 5, 6. Thus, the valve 1 can be simply and reliably mounted on the base member 10.

When the valve 1 is removed from the base member 10, the first side surface 2a of the valve body 2 and the operation section 8c of the second mounting lever 8 are held from both sided by fingers. Then, the operation section 8c is pressed as indicated by the dotted line in FIG. 5 to elastically deform the shoulder 8a of the second mounting lever 8 to a position at which the stopper 8g abuts the second side surface 2e of the valve body 2. Accordingly, the engaging section 8d is removed from one of the engaging grooves 16 of the base member 10. Then, the valve 1 is rotated about the end of the bottom 2c of the adaptor 2b on the first side surface 2d in a direction indicated by the arrow A of FIG. 6 so that the ports 5, 6 are inclined to an angle in which they are withdrawn from the supply hole 12 and the output hole 13. Then, the valve 1 is slidingly moved in the left direction in FIG. 6 so that the engaging section 7d of the first mounting lever 7 is released from the engaging groove 16, thereby removing the valve 1 from the base member 10.

As described above, the valve 1 can be removed from the base member 10 by elastically deforming only one second mounting lever 8 with fingers. Accordingly, the valve 1 can be removed from the base member 10 with a simple operation and small operation force compared with a conventional valve in which both mounting levers 7, 8 are simultaneously elastically deformed with fingers. Further, in comparison with other conventional valves, that is, valves configured such that only one mounting lever is elastically deformed and the other mounting lever is not elastically deformed, both mounting levers 7, 8 of the valve 1 are elastically deformed. As a result, an extent of elastic deformation of the second mounting lever 8 can be decreased, thereby allowing for a simple operation and a small operation force.

Although in the above embodiment, a valve which houses a valve mechanism as a poppet type 2 port solenoid valve in an elongated valve body 2 is described. However, the present invention can be applied to other valves having general configuration to be mounted for use on the base member.

REFERENCE SIGNS LIST

1: valve
2: valve body
2*d*: first side surface
2*e*: second side surface
7, 8: mounting lever
7*a*, 8*a*: shoulder
7*b*, 8*b*: arm
7*c*, 8*c*: connecting section
7*d*, 8*d*: engaging section
8*g*: stopper
8*h*: finger hooking section
10: base member

The invention claimed is:

1. A snap-fit type valve comprising:
a pair of mounting levers that allow a valve body in which a valve mechanism for opening and closing a fluid flow path is housed to be engaged with a piping base member in a snap-fit manner, wherein
the pair of mounting levers include shoulders which extend in opposite directions from a first side surface of the valve body and a second side surface which is opposite to the first side surface, arms which extend in the same direction parallel to each other from a distal end of the shoulders, and engaging sections formed on a distal end of the arms so as to engage with the base member, and each of the mounting levers is elastically deformable in a direction in which a distance between the engaging sections increases,
a first mounting lever which is one of the pair of mounting levers has the shoulder and the arm connected to each other via an arch shaped connecting section and is formed to be elastically deformable at least at a position of the connecting section,
a second mounting lever which is the other of the pair is formed to be deformable at a position of the shoulder, and has an operation section formed at a proximal end of the arm to protrude in a direction opposite to the arm so as to elastically deform the shoulder, and the operation section is provided to only the second mounting lever, and the first mounting lever does not have the operation section.

2. The snap-fit type valve according to claim 1, wherein
a thickness of the shoulder of the second mounting lever is smaller than a thickness of the arm and the operation section, and
a thickness of the shoulder, the connecting section and the arm of the first mounting lever is smaller than a thickness of the arm and the operation section of the second mounting lever.

3. The snap-fit type valve according to claim 1, wherein, among the shoulder, the arm and the connecting section of the first mounting lever, a thickness of the arm and the connecting section are the same as each other, and a thickness of the shoulder is largest at a proximal end connected to the valve body, gradually decreases toward a distal end connected to the connecting section, and is the same as a thickness of the connecting section at the distal end.

4. The snap-fit type valve according to claim 2, wherein, among the shoulder, the arm and the connecting section of the first mounting lever, the thickness of the arm and the connecting section are the same as each other, and the thickness of the shoulder is largest at a proximal end connected to the valve body, gradually decreases toward a distal end connected to the connecting section, and is the same as the thickness of the connecting section at the distal end.

5. The snap-fit type valve according to claim 2, wherein the thickness of the shoulder of the second mounting lever is the same as the thickness of the arm and the connecting section of the first mounting lever.

6. The snap-fit type valve according to claim 3, wherein a thickness of the shoulder of the second mounting lever is the same as the thickness of the arm and the connecting section of the first mounting lever.

7. The snap-fit type valve according to claim 4, wherein the thickness of the shoulder of the second mounting lever is the same as the thickness of the arm and the connecting section of the first mounting lever.

8. The snap-fit type valve according to claim 1, wherein a stopper which protrudes toward the valve body is formed at a distal end of the operation section of the second mounting lever, a finger hooking section which protrudes in a direction opposite to the stopper, and a protruding height of the finger hooking section is larger than a protruding height of the stopper.

9. The snap-fit type valve according to claim 1, wherein tubular shaped ports are disposed on a bottom of the valve body so as to extend vertically to the bottom, and a length of the ports which protrudes from the bottom is the same as or larger than a length (n) of the arms of the mounting levers which protrudes from the bottom.

* * * * *